(12) United States Patent
Ishii (10) Patent No.: US 6,955,438 B2
(45) Date of Patent: Oct. 18, 2005

(54) STRUCTURE FOR ILLUMINATING POINTER OF METER

(75) Inventor: Mikio Ishii, Tokyo (JP)

(73) Assignee: Calsonic Kansei Corporation, Tokyo (JP)

( * ) Notice: Subject to any disclaimer, the term of this patent is extended or adjusted under 35 U.S.C. 154(b) by 0 days.

(21) Appl. No.: 10/833,238

(22) Filed: Apr. 26, 2004

(65) Prior Publication Data

US 2004/0212977 A1    Oct. 28, 2004

(51) Int. Cl.[7] ............................................. F21V 33/00
(52) U.S. Cl. ......................... 362/29; 362/26; 116/288
(58) Field of Search ........................... 362/29, 26, 489, 362/30; 116/284, 286, 287, 288

(56) References Cited

U.S. PATENT DOCUMENTS

| | | | |
|---|---|---|---|
| 4,625,262 A | * | 11/1986 | Sakakibara et al. ............ 362/26 |
| 5,458,082 A | | 10/1995 | Cookingham ................ 116/288 |
| 5,983,827 A | | 11/1999 | Cookingham et al. ....... 116/288 |
| 6,182,601 B1 | * | 2/2001 | Baatz .......................... 116/288 |
| 6,408,784 B1 | * | 6/2002 | Ross ............................ 116/288 |
| 6,854,416 B2 | * | 2/2005 | Breinich et al. ............. 116/202 |

FOREIGN PATENT DOCUMENTS

| | | |
|---|---|---|
| DE | 3425029 A1 | 1/1985 |
| JP | 09096550 | 4/1997 |

\* cited by examiner

Primary Examiner—Laura K. Tso
(74) Attorney, Agent, or Firm—J.C. Patents (57) ABSTRACT

A structure for illuminating a pointer of a meter, including a light translucent pointer including a pointer body having a base provided with a light emitting surface, and a cover cap member provided on said light emitting surface of the base, the pointer body including a reflective/refractive plane provided in said base, the reflective/refractive surface reflecting a portion of illumination light introduced in the base to go longitudinally of the pointer body and transmitting another portion of the illumination light to go toward the light emitting surface, the cover cap member having a light translucent layer and a light shielding layer disposed inside the light translucent layer, the light shielding layer having an opening passing through the another portion of the illumination light transmitting the reflective/refractive plane.

8 Claims, 7 Drawing Sheets

STRUCTURE FOR ILLUMINATING POINTER OF METER

BACKGROUND OF THE INVENTION

1. Field of the Invention

The present invention relates to a structure for illuminating a pointer of a meter, installed in a meter device or the like for a vehicle, particularly to a structure for illuminating a pointer of a meter, which is easy to look the pointer throughout the daytime and the nighttime.

2. Description of Related Art

Figure 8:
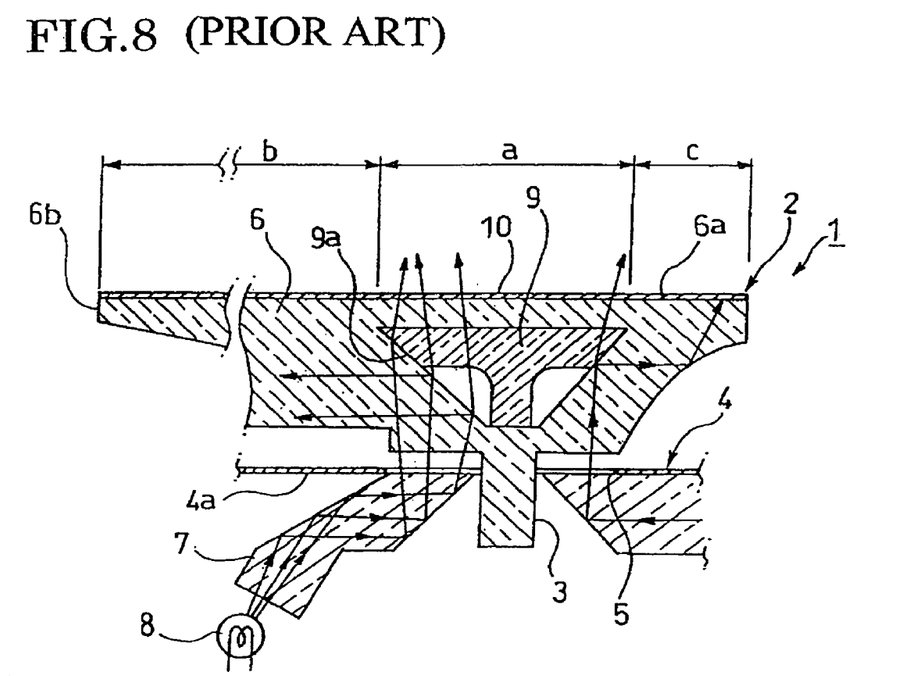
FIG. 8 is a partial longitudinal sectional view showing a conventional structure for illuminating a pointer of meter.

Conventionally, there is known a structure for illuminating a pointer of a meter in a meter device mounted on a vehicle such as an automobile or the like as shown in FIG. 8 (for example, see FIG. 1, Japanese Utility Model Publication H 6-7310).

In the conventional structure for illuminating the pointer of the meter, the pointer 2 of the meter 1 for the vehicle has a rotating shaft 3, which is inserted rotatably into an opening 5 formed in a dial 4, as shown in FIG. 8.

The pointer 2 has a pointer body 6 made of a translucent material. The dial 4 is located below the pointer 2, and a light guiding member 7 is attached to a lower surface 4a of the dial 4. Light from a light source 8 located below the dial 4 is introduced through the light guiding member 7 into the pointer body 6 of the pointer 2 along an axis of the rotating shaft 3.

Provided within the pointer body 6 is a half translucent light scattering member 9 disposed above the rotating shaft 3, which has an inclined reflecting surface 9a which reflects illuminating light introduced in the pointer body 6 upwardly to direct it to a leading end 6b of the pointer body 6 and transmits the illuminating light to direct upwardly toward an upper surface 6a of the pointer body 6. A hot stamp 10 is disposed throughout approximately the entire length of the upper surface 6a of the pointer body 6.

In the conventional structure for illuminating the pointer of the meter configured as described above and shown in FIG. 8, the illumination light directing upwardly along the rotating shaft 3 is scattered by the scattering member 9. Consequently, after the pointer body 6 and the scattering member 9 are configured separately, the scattering member 9 must be assembled to the pointer body 6, and therefore the number of parts is increased and good workability for assembling is not acquired.

Although the hot stamp 10 is provided on the upper surface 6a of the pointer body 6 so that functional parts of the scattering member 9 and so on within the pointer body 6 are not viewed from an outside area, because a process for providing the hot stamp 10 is added, there is a problem that manufacturing cost is much.

SUMMARY OF THE INVENTION

It is, therefore, an object of the present invention to provide a structure for illuminating a pointer of a meter, which has less number of parts and a good appearance of the pointer and which is capable of illuminating a top surface of a pointer.

To attain the above object, a structure for illuminating a pointer of a meter, according to the present invention comprises a light translucent pointer including a pointer body having a base provided with a light emitting surface, and a cover cap member provided on the light emitting surface of the base.

The pointer body includes a reflective/refractive plane provided in said base. The reflective/refractive surface reflects a portion of illumination light introduced in the base to go longitudinally of the pointer body and refracts another portion of the illumination light to go toward the light emitting surface.

The cover cap member includes a light translucent layer and a light shielding layer disposed inside the light translucent layer. The light shielding layer has an opening passing through the another portion of the illumination light transmitting the reflective/refractive plane.

DETAILED DESCRIPTION OF THE PREFERRED EMBODIMENTS

Several embodiments of the present invention will be explained with reference to FIGS. 1 to 7 below. In FIGS. 1 to 7, the same references numerals are attached to parts similar to that as in the prior art as described above.

Figure 1:
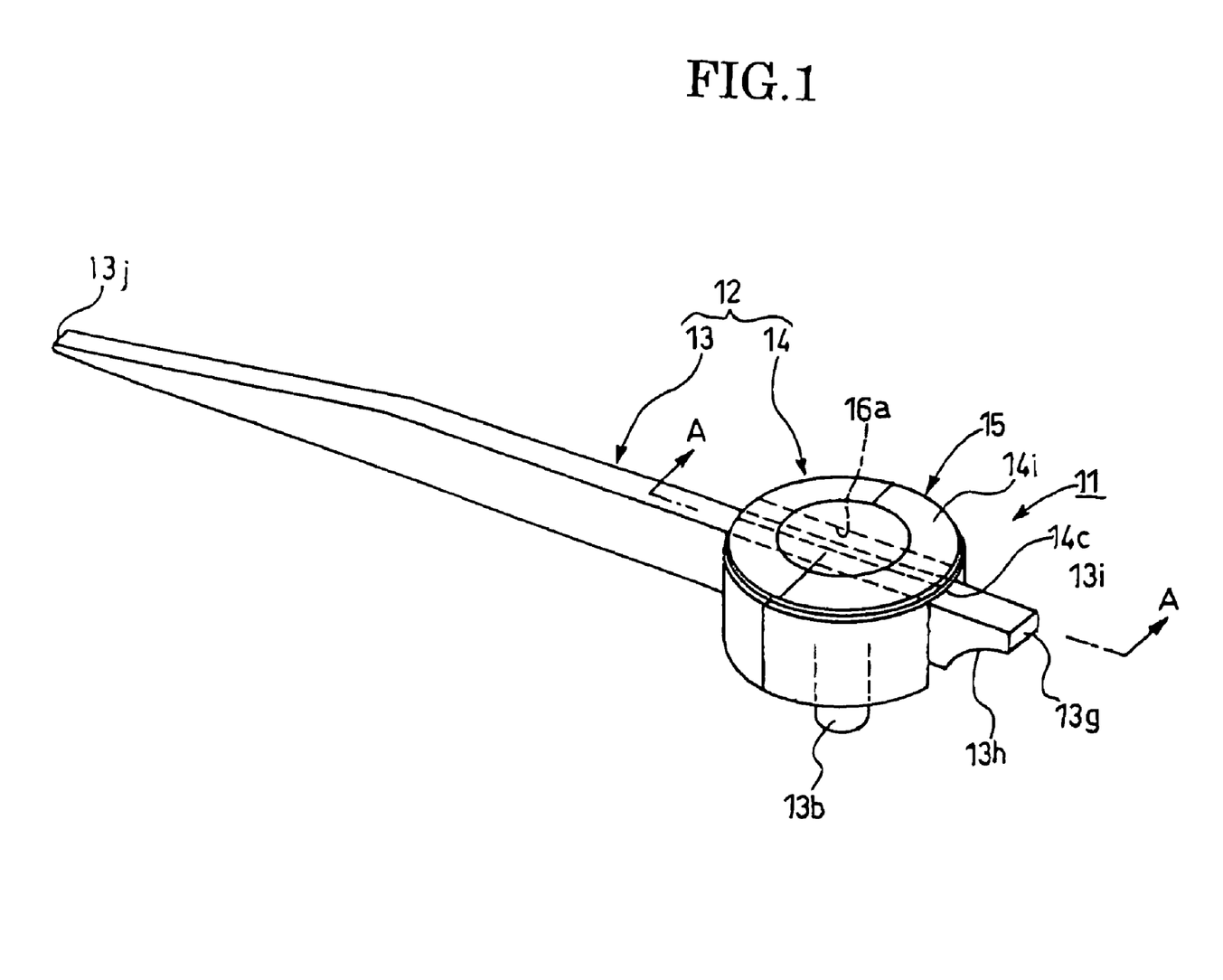
FIG. 1 is a perspective view showing one embodiment of a structure for illuminating a pointer of a meter, according to the present invention.
Figure 2:
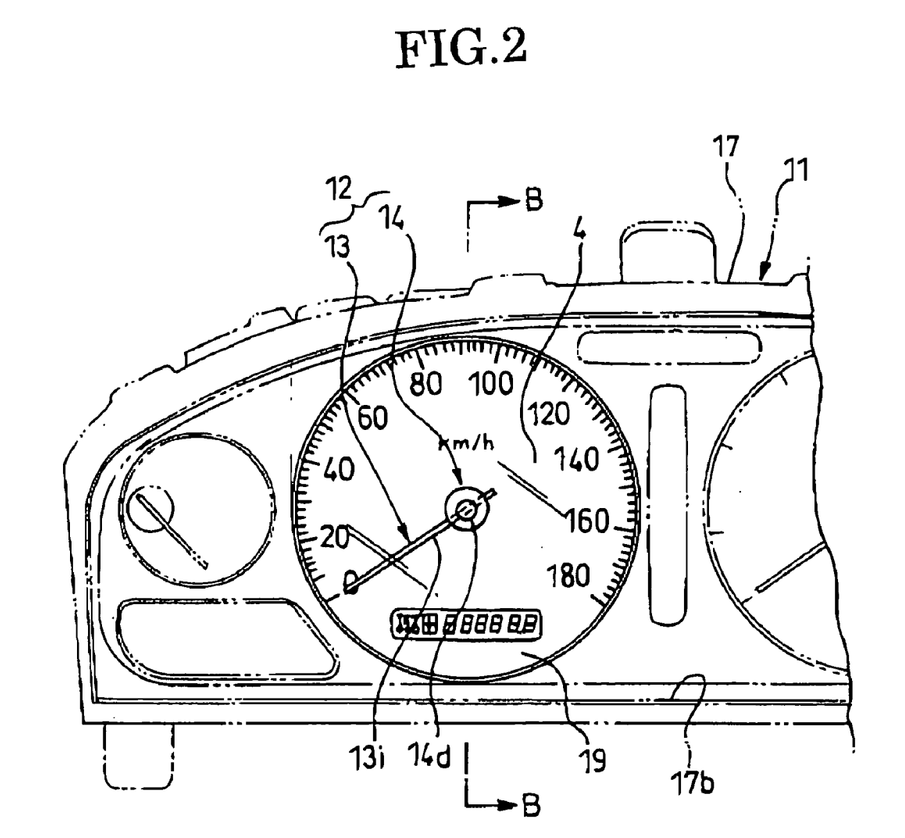
FIG. 2 is a front view showing the structure for illuminating the pointer as shown in FIG. 1.
Figure 3:
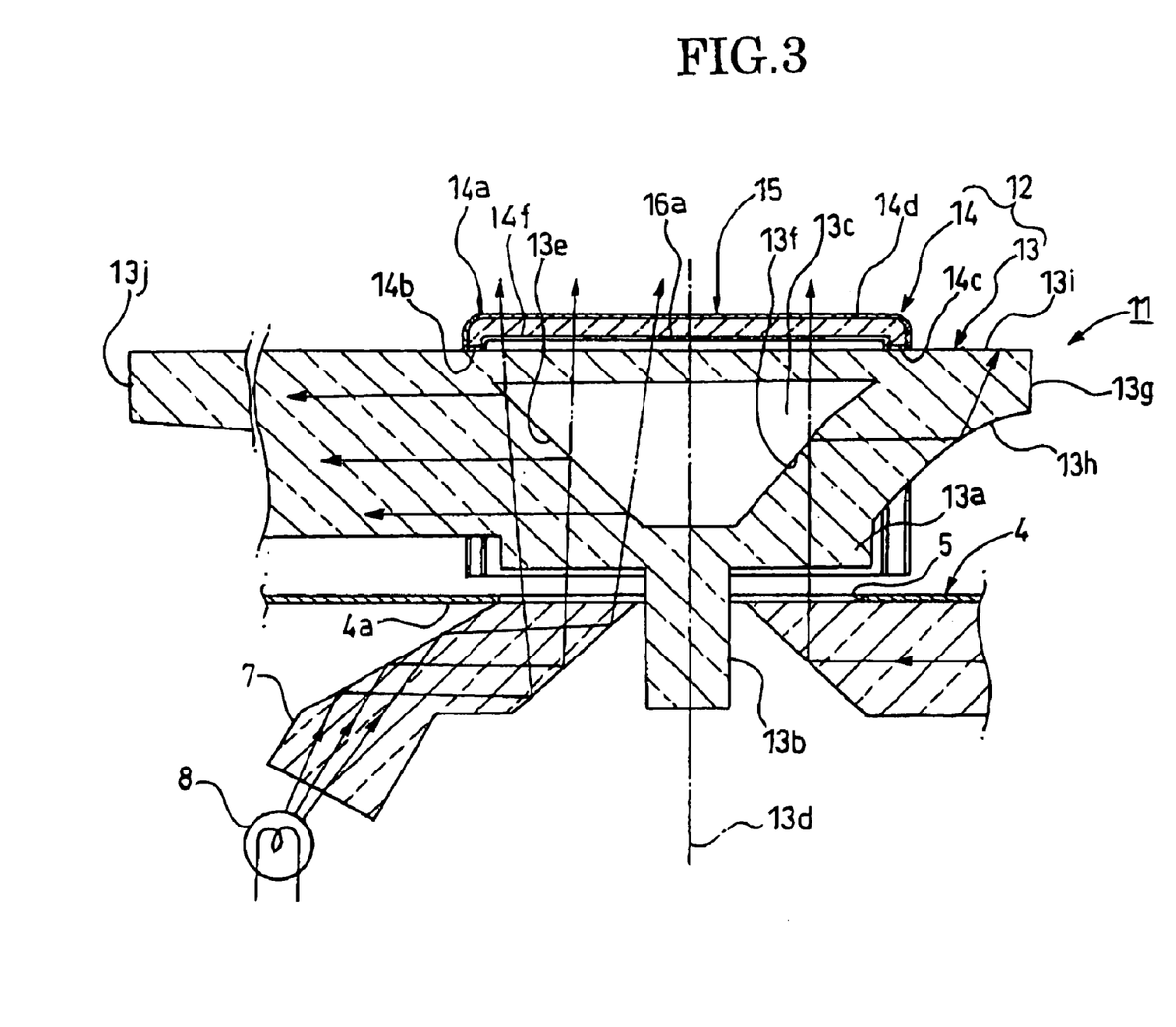
FIG. 3 is a partial sectional view taken along the A—A line in FIG. 1.

FIGS. 1 to 3 illustrate on embodiment of a structure for illuminating a pointer of a meter, according to the present invention.

The structure for illuminating the pointer of the meter, in the embodiment comprises a pointer 12 provided in the meter 11 for a vehicle and a cover cap member 14 provided on the pointer 12.

The pointer 12 is formed of a light translucent material and includes an elongated pointer body 13. The pointer body 13 has a disk shaped base 13a integrally formed with the pointer body 13. An upper surface of the base 13a is provided with a light emitting surface 13i. The cover cap member 14 is disposed to cover a portion of the light emitting surface 13i and fixed to the base 13a by any suitable means.

A lower surface of the base 13a is provided with a rotating shaft 13b, which is inserted rotatably into the opening 5 provided in the dial 4, as described in the prior art. As described above, attached on the lower surface 4a of the dial 4 is the light guiding member 7, below of which the light source 8 for radiating light to the light guiding member 7 is provided.

The light source 8 is controlled not to light in the daytime and to light in the night time.

There is provided a reflective/refractive plane in the base 13a, which, when illumination light emitted from the light source 8 is introduced through the light guiding member 7 into the base 13a along an axis 13d of the rotating shaft 13b, is configured to reflect a portion of the illumination light introduced in the base 13a to go longitudinally of the pointer body 13 and to refract another portion of the illumination light to go toward the light emitting surface 13i.

The reflective/refractive plane is composed of oblique surfaces of a gap 13c provided in the base 13a, in one embodiment. The gap 13c has approximately an inverted trapezoidal shape, as viewed from FIG. 3. As a result, an anterior oblique reflective surface 13e is provided at a front end of the gap 13c and a posterior oblique reflective surface 13f is provided at a back end of the gap 13c, as the oblique surfaces.

The anterior oblique reflective surface 13e is configured to reflect a portion of the illumination light toward a leading end 13j of the pointer body 13, and to refract or transmit another portion of the illumination light to direct in an upper direction within the pointer body 13 and to guide to the light emitting surface 13i of the pointer body 13, whereby illuminating the light emitting surface.

The posterior oblique reflective surface 13f is configured to reflect a portion of the illumination light to guide toward an end reflective surface 13h formed in the vicinity of a back end 13g of the pointer body 13 and to direct the light reflected on the end reflective surface 13h to the light emitting surface 13i, whereby illuminating the light emitting surface 13i. The posterior oblique reflective surface 13f is also configured to refract or transmit another portion of the illumination light to go upwardly toward the light emitting surface 13i, whereby illuminating it.

Figure 4:
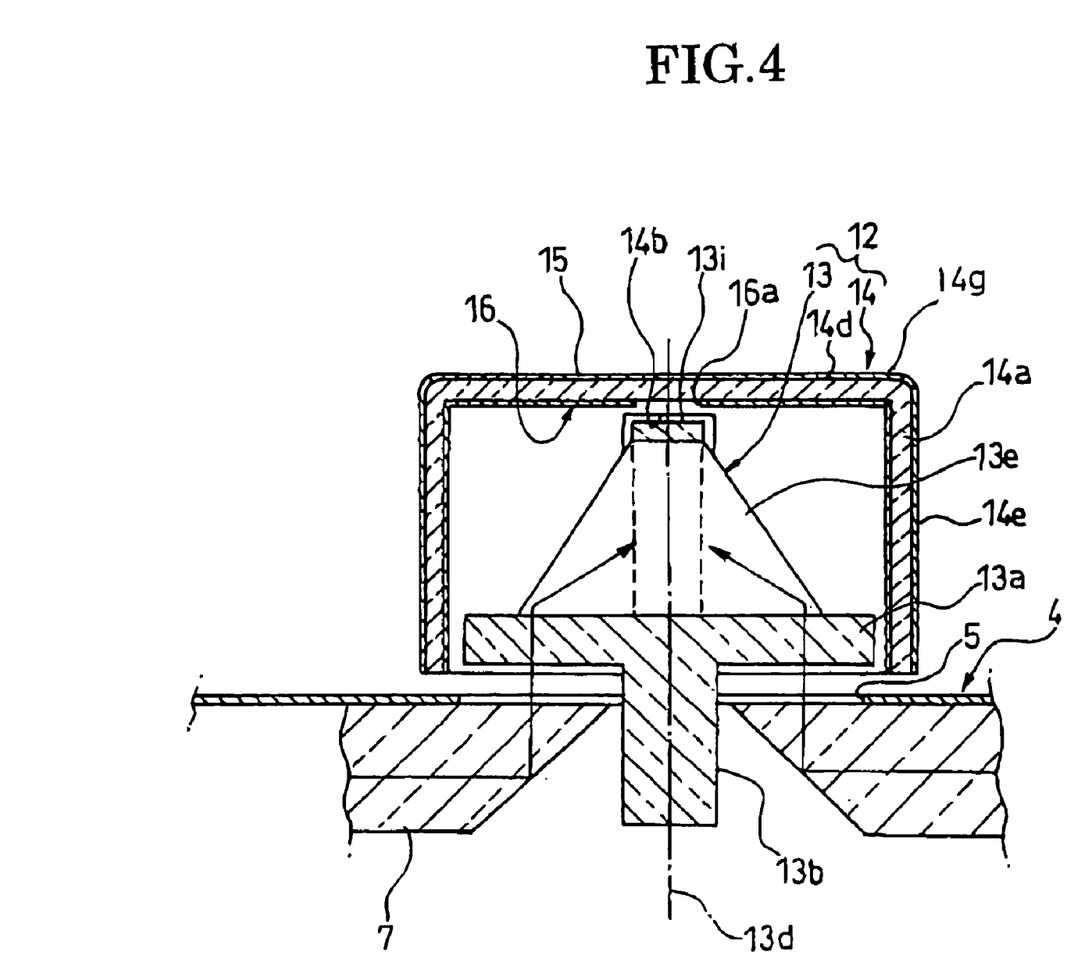
FIG. 4 is a partial sectional view showing another embodiment of the structure for illuminating the pointer.

The cover cap member 14 is formed of a transparent resin material and has a generally dished shape as shown in FIG. 3 or a generally cylindrical shape as shown in FIG. 4.

The cover cap member 14 includes a light translucent layer 14a and a light shielding layer 14f disposed inside the light translucent layer 14a. The light translucent layer 14a has a transparent layer 14d, which is the outermost layer, and a half minor layer 15 disposed inside the transparent layer 14d. The half mirror layer 15 has a color of metal tone on a surface adjacent the transparent layer 14d. The color can be viewed through the transparent layer 14d.

Meanwhile, forward and backward side surfaces of the cover cap member 14 are formed with front and back cutout portions 14b and 14c in which the pointer body is inserted (see FIG. 3). The half mirror layer 15 is provided having a certain thickness on an inner surface of the transparent layer 14d by deposition or painting.

FIG. 4 illustrates another embodiment of the present invention. In the embodiment, a pointer body 13 has a base 13a whose thickness is thinned, and a light emitting surface 13i provided through a reflective portion 13e on the base 13a. The cover cap member 14 shown in FIG. 4 includes an upper surface portion 14g and a side surface portion 14a.

A light shielding layer 16 is provided inside the light translucent layer 14a in the embodiment as shown in FIG. 4. The light emitting layer 14f or 16 comprises a dark painting layer, for example.

Figure 6:
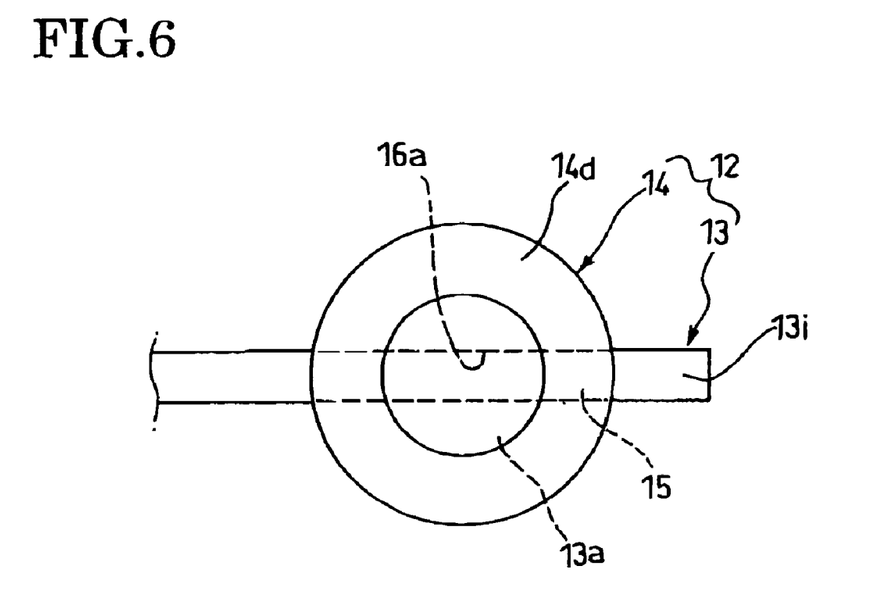
FIG. 6 is a top plan view showing a cover cap member in a non-lighting state, in the structure for illuminating the pointer as shown in FIG. 1.

Each of the light shielding layers 14f and 16 is formed with an opening, for example, a slit 16a, viewing from above, as shown in FIG. 6, which is provided in an area of each light shielding layer overlapping the light emitting surface 13i. As a result, the illumination light arrived the light emitting surface 13i is emitted from the light emitting surface 13i and then passes through the slit 16a and the light translucent layer 14a, and emitted from the cover cap member 14.

The pointer 12 of the meter 11 for the vehicle in the aforementioned embodiments is installed in a housing 17 for containing the dial 4 and a lower case 17a, together with a movement 18 with which the rotating shaft 13b is connected, as shown in FIGS. 2 to 5.

Figure 5:
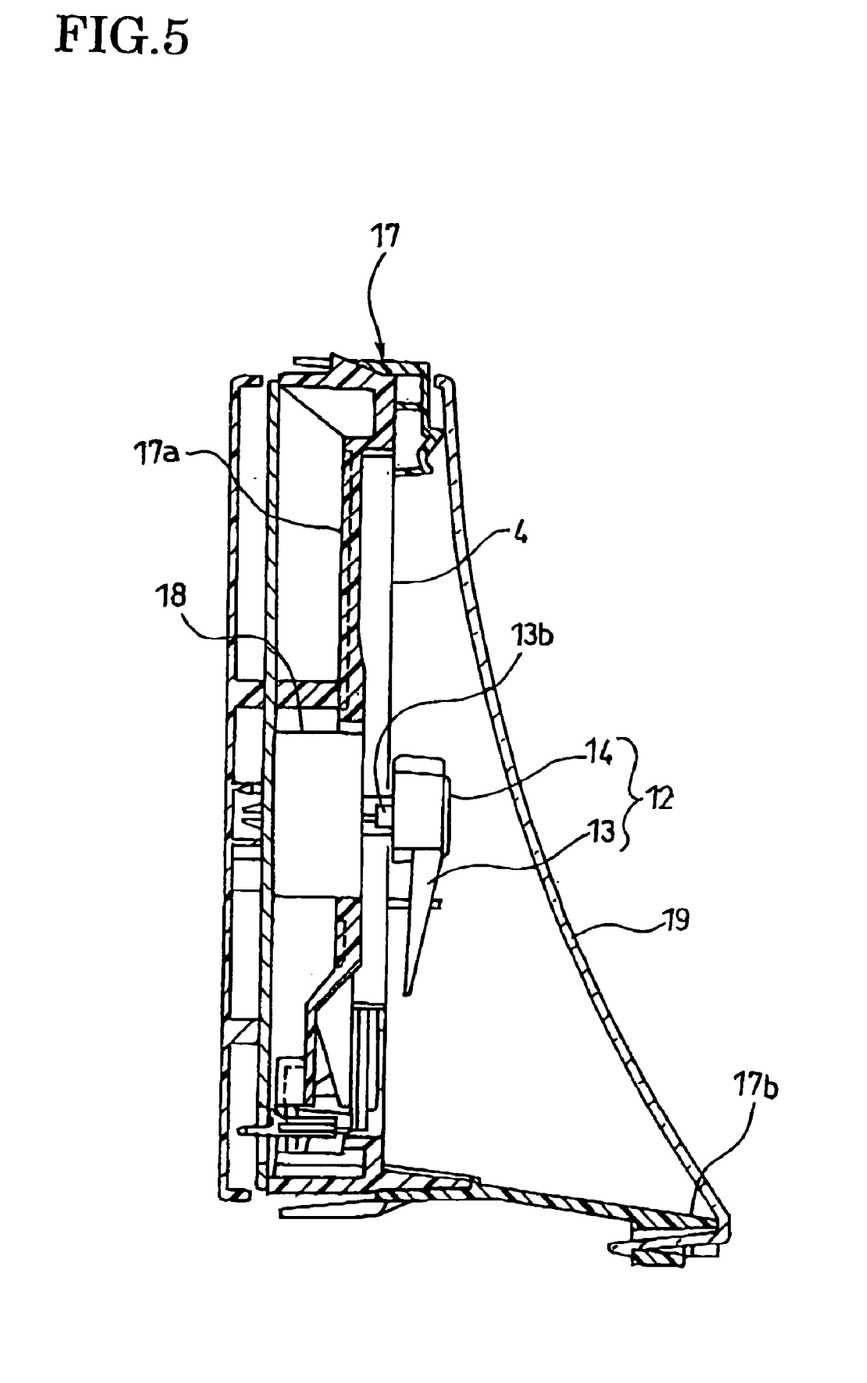
FIG. 5 is a sectional view taken along the B—B line in FIG. 2.

At a front opening 17b of the housing 17 is provided a front cover panel member 19 which is made of a colored resin material having a predetermined value of light translucent ratio, (see FIG. 5).

The structure for illuminating the pointer 12 is configured so tat the pointer 12 can be viewed through the front cover panel member 19 from an occupant in the vehicle, and therefore it is possible to configure a so-called high contrast meter in which a good contrast with the environment is achieved even in the night time by the illumination light of the pointer 12.

Next, an, operation with respect to the aforementioned embodiments will be explained.

In the daytime that the light source 8 is not lighted, the illumination light is not introduced in the pointer body 13. In the state, because the base 13a of the pointer body 13 is covered by the half mirror layer 15 and the light shielding layer 14f or 16 of the cover cap member 14 as shown in FIGS. 3 and 4, visual line from of a person the outside area is shut out and therefore an inner structure within the pointer 12 cannot be viewed, as shown in FIG. 6. Consequently, a good appearance of the structure for illuminating the pointer is accomplished. In particular, because the slit 16a provided in the light shielding layer 14f or 16 of the cover cap member 14 is covered by means of the half mirror layer 15, the slit cannot be viewed from the outside area. Accordingly, an outer surface of the cover cap member 14 can be viewed to take uniformly on the color of metal tone, and therefore a good appearance is accomplished. Moreover, in the night time, when the illumination light from the light source 8 is introduced through the light guiding member 7 into the pointer body 13, as shown in FIG. 3, at the front end surface of the gap 13c formed in the pointer body 13, the anterior oblique reflective surface 13e reflects the one portion of the illumination light introduced into the pointer body 13 toward the leading end 13j of the pointer body 13, and transmits the another portion of the illumination light to guide in the upper direction within the pointer body 13 to illuminate the light emitting surface 13i of the pointer body 13.

The posterior oblique reflective surface 13f reflects the one portion of the illumination light to guide toward the end reflective surface 13h and transmits the another portion of the illumination light to direct to the light emitting surface 13i. The end reflective surface 13h reflects light reflected on the posterior oblique reflective surface 13f to direct to the light emitting surface 13i. The light emitting surface 13i is illuminated by the light directed to the light emitting surface 13i, as described above.

Figure 7:
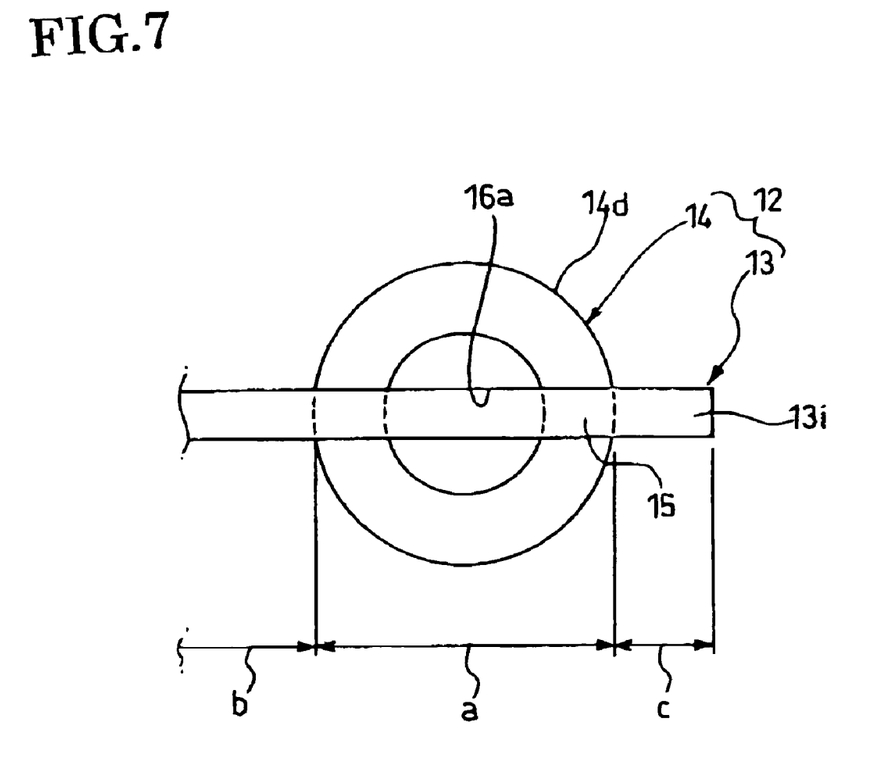
FIG. 7 is a top plan view showing a cover cap member in a lighting state, in the structure for illuminating the pointer as shown in FIG. 1.

In this way, if the light emitting surface 13i of the pointer body 13 is illuminated, when looking the area portion of the light emitting surface 13i surrounded by the cover cap member 14 from the outside, as shown in FIG. 7, the slit 16a bridged on a central portion of the upper surface, namely, the transparent layer 14d of the cover cap member 14 the can be viewed. This is because the illumination light introduced into the pointer body 13 from below of the pointer 12 along the rotating shaft 13b is faded, when passing through the half mirror layer 15, as shown in FIG. 3. As a result, as shown in FIG. 7, the area of the light emitting surface 13i surrounded by the cover cap member 14 can be viewed from the outside, with the same amount of light emitting as another area of the light emitting surface 13i, which is not surrounded by the cover cap member 14. Accordingly, it is possible to acquire a uniform amount of light emitting throughout the whole of the pointer body 13 and therefore to accomplish a good appearance of the pointer.

In the present invention, it is avoided increase the number of parts because the scattering member 9 as in the prior art is not required.

Moreover, in the present invention, the hot stamp as in the prior art is not required because it is not possible to look the inner structure within the pointer body by the half mirror layer 15 and the light shielding layer 16.

Consequently, the present invention makes it possible to eliminate manufacturing processes of the assembling of the scattering member 9 and the printing of the hot stamp 10 and so on, as in the prior art, and therefore to reduce a manufacturing cost.

In particular, the scattering member 9 must be assembled to the pointer body by inserting the scattering member 9 into the gap 13c formed in the right and left side surfaces of the base 13a of the pointer body, 13 as shown in the embodiments of the present invention, from any of right and left directions, and as a result, it is difficult to assemble the scattering member by an automatic assembling machine.

In the present invention, it is not necessary to assemble the scattering member 9, because it is not required. It is also possible to install the cover cap member 14 to the pointer body 13 by any automatic assembling machine because the cover cap member 14 is installed only by fitting it on the base 13a of the pointer body 13 firm above.

As the above, although the embodiments of the structure for illuminating the pointer are explained, the present invention is limited to these embodiments, various changes and modifications may be made to the embodiments.

For example, although the anterior and posterior oblique reflective surfaces are provided at the front and back end surfaces of the gap, respectively, in the above embodiments, the anterior and posterior oblique reflective surfaces may be provided in any position of the base, the gap is not necessarily required.

Moreover, although the cover cap member 14 is formed into the dished shape shown in FIG. 3 or the cylindrical shape shown in FIG. 4, mainly, it may be formed into a polygonal shaped cylinder such as hexagonal and octagonal shaped cylinders having top surfaces. A shape and a material of the cover cap member are also not limited to the aforementioned embodiments.

The opening formed in the light shielding layer is not limited to the slit, the other shape may be used.

Furthermore, although the light shielding layer is disposed at the lowermost layer of the cover cap member, it may be provided at the uppermost layer thereof.

What is claimed is:

1. A structure for illuminating a pointer of a meter, comprising:
   a light translucent pointer including a pointer body having a base provided with a light emitting surface; and
   a cover cap member provided on said light emitting surface of the base,
   said pointer body including a reflective/refractive plane provided in said base, said reflective/refractive plane reflecting a portion of illumination light introduced in the base to go longitudinally of the pointer body and transmitting another portion of the illumination light to go toward the light emitting surface,
   said cover cap member including a light translucent layer and a light shielding layer disposed inside the light translucent layer,
   said light shielding layer having an opening passing through the another portion of the illumination light transmitting the reflective/refractive plane.

2. The structure for illuminating a pointer of a meter according to claim 1, wherein said reflective/refractive plane is composed of oblique surfaces of a gap provided in the base.

3. The structure for illuminating a pointer of a meter according to claim 1, wherein said cover cap member has a generally dished shape.

4. The structure for illuminating a pointer of a meter according to claim 1, wherein said cover cap member has a generally cylindrical shape.

5. The structure for illuminating a pointer of a meter according to claim 1, wherein the light translucent layer of the cover cap member includes a transparent layer and a half mirror layer disposed inside the transparent layer.

6. The structure for illuminating a pointer of a meter according to claim 1, wherein said opening is composed of a slit.

7. The structure for illuminating a pointer of a meter according to claim 1, wherein said light shielding layer is composed of a painted layer provided on an inner surface of the light translucent layer.

8. The structure for illuminating a pointer of a meter according to claim 5, wherein a surface of the half mirror layer adjacent the transparent layer has a color of metal tone.

* * * * *